Nov. 8, 1960                T. DUNNEGAN, JR                2,959,375
                            CRAB ANGLE COMPUTER
Filed Sept. 19, 1957                                   3 Sheets-Sheet 1
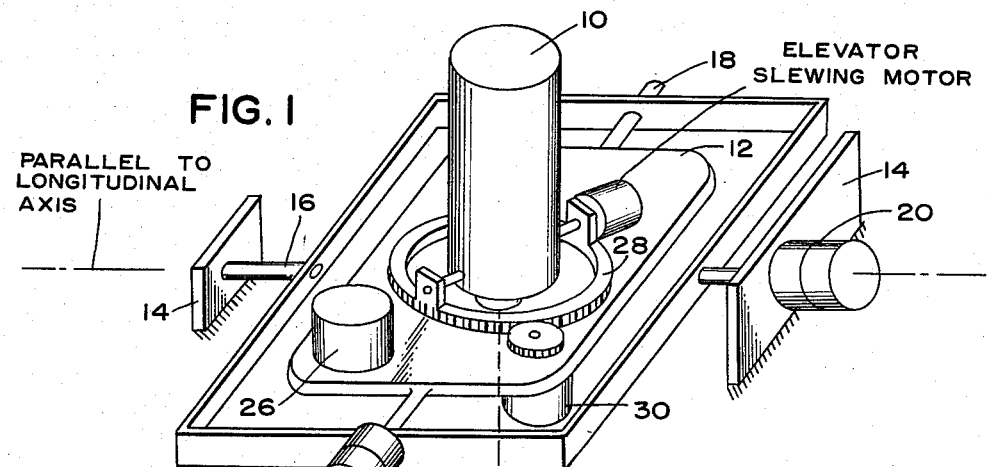
FIG. 1
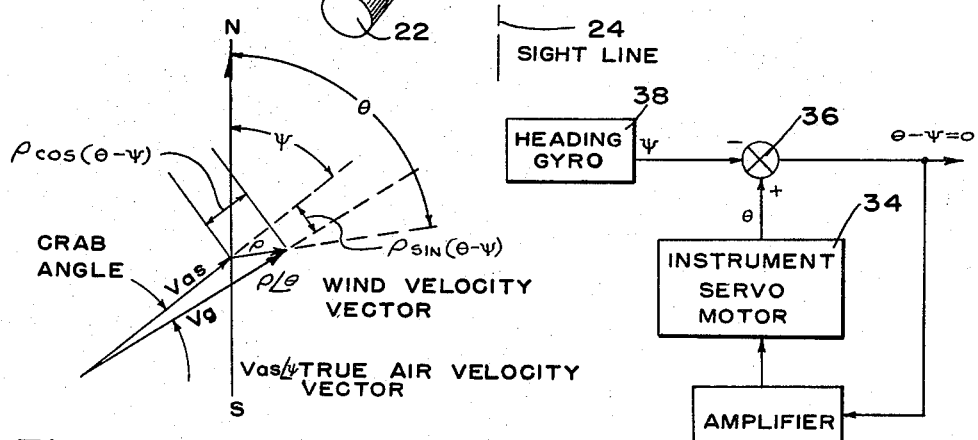
FIG. 2
FIG. 3
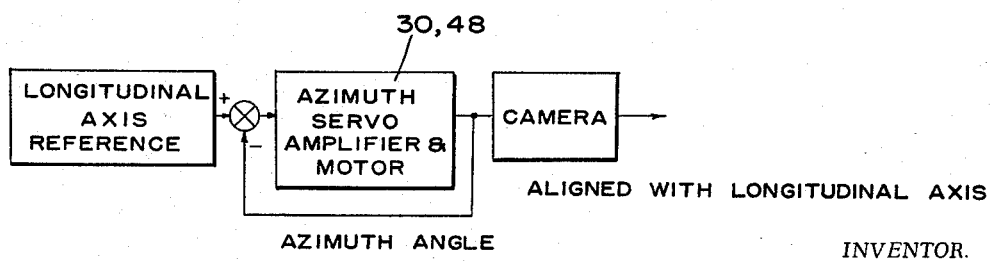
FIG. 4
INVENTOR.
TED DUNNEGAN, JR.
BY
Raymond W. Colter
ATTORNEY United States Patent Office 2,959,375
Patented Nov. 8, 1960

2,959,375
CRAB ANGLE COMPUTER

Ted Dunnegan, Jr., Dallas, Tex., assignor, by mesne assignments, to Temco Electronics & Missiles Company, Dallas, Tex., a corporation of Delaware Filed Sept. 19, 1957, Ser. No. 684,984

8 Claims. (Cl. 244—14)

This invention relates to a crab angle computing system for aircraft, whereby observation and computation of the crab angle may be made through an air to ground television link.

An object of this invention is to provide a crab angle computer system for aircraft, wherein the computer may be set to maintain continuous control of the viewing angle of a camera adjustably mounted in the aircraft, so as to maintain such angle in alignment with the ground track, regardless of any change in the heading on which the aircraft might be directed.

A further object is to provide a crab angle computer in a remotely controlled aircraft or missile equipped with a television transmitter, which may be set, and monitored from the ground to be reset, by means of radio command receiver control, to maintain the viewing angle of the television (TV) camera aligned with the ground track for any heading on which the aircraft or missile might be steered, so as to facilitate navigation of a remotely controlled aircraft by dead reckoning, making bombing runs, or controlling a missile attack by television guidance.

Another object is to mount an air to ground television transmitter on a remote controlled aircraft or missile having a horizontally stabilized TV camera platform, on which the camera is adjustably mounted, and to provide a crab angle computer for maintaining the camera viewing angle in line with the ground track of the aircraft or missile, as the heading is changed, after the proper values of the local wind vector have been set into the computer by radio command from the ground in accordance with TV observations of the movement of ground objects with reference to the vertical on the TV screen.

It is also among the objects of this invention to provide a crab angle computer in an aircraft or missile for continuously solving the crab angle vector triangle, as the heading is changed by remote control, for maintaining the viewing angle of the camera adjusted in line with the aircraft ground track, so that the camera can be adjusted on a transverse axis to any elevation of its sightline along the ground track.

Other and more specific objects will become apparent in the following detailed description of one form of computer and system which may be used to carry out the objects of this invention, as illustrated in the accompanying drawings, wherein:

Fig. 1 is a perspective schematic view showing a horizontally stabilized TV camera platform and camera adjustably mounted thereon;

Fig. 2 is a vector diagram illustrating a typical problem and its solution as performed by the crab angle computer used in the present system;

Figs. 3 and 4 are block diagrams of portions of computer circuits showing how the wind direction is determined;

Figure 5:
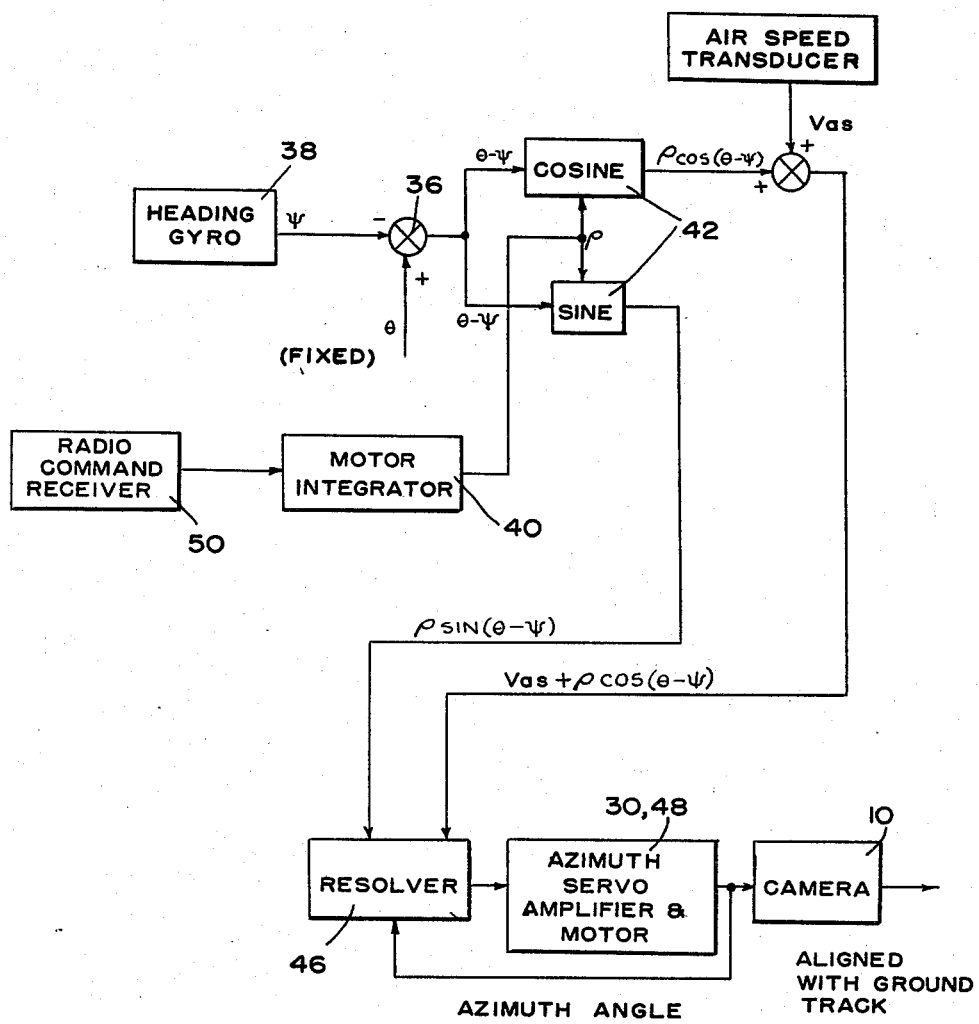
Fig. 5 is a block diagram of computer circuits showing how the computer is set for solving the crab angle triangle at any specific setting of the heading at an angle $\theta - \psi$ with respect to the wind direction.

The crab angle computing system constituting the subject matter of the present invention is intended for use with an aircraft or missile carrying an air to ground television transmitter. Whereas crab angle computation is essential when such an aircraft is to be navigated by dead reckoning, the system is also applicable to a missile used for attack under television guidance where compensation for the effects of wind must be made to secure a hit.

The problem is of course, to detect and measure the drift effects of wind. The present crab angle computing system requires that the ground based operator can see the ground from the airplane via the television link and that he can change the viewing angle of the TV camera aboard the plane by radio control so that visible objects on the ground viewed by the camera move in a vertical line across the receiver viewing screen as the aircraft flies over them.

After the operator has performed the camera alignment operation under two defined conditions, the direction and magnitude of the wind velocity are determined in the aircraft and the computer will maintain alignment of the camera in the direction of the ground track of the aircraft.

A change in wind velocity after its original determination will show up as a lateral drift of objects across the viewing screen as the aircraft flies over them, and by observing how such objects move across the screen, a continuous monitoring of wind conditions is possible from the ground, so that a shift in wind can be compensated as soon as it is detected.

Fig. 1 depicts a TV camera mount for use in the proposed system wherein a camera 10 is carried on a platform 12 supported in the frame 14 of the aircraft by means of gimbals 16 and 18 which are driven by servo motors 20 and 22 respectively. These servo motors are slaved to the roll and pitch axes of a vertical gyroscope located in the aircraft, the stabilized camera platform being necessary to hold the sight line 24 fixed in space as the airplane maneuvers or encounters air disturbances.

A magnetically-slaved directional gyroscope 26 is also mounted on the camera platform to assure that errors in heading measurement will not occur during maneuvers of the craft.

Fig. 2 is a vector diagram which depicts the aircraft airspeed $V_{as}$, the wind velocity $\rho$, and the ground velocity $V_g$ all referenced to magnetic north, and it is this vector triangle that is solved by the crab angle computer. The novel aspect of the use of this computer is the manner in which the visual information received by the TV link is used to determine the wind direction and magnitude, and to provide continuous monitoring of wind conditions of the aircraft position.

Fig. 3 shows in block diagram form how the wind direction is determined. The camera mount 28 is driven by a servo 30 to exact alignment with the longitudinal axis 32 of the aircraft. An instrument servo 34 is energized which drives a differential device 36 so that an angle $\theta$ of the motor shaft is made to equal the heading angle $\psi$ as measured by the heading gyroscope 38. The aircraft is then turned by radio command signals until objects passing under the plane viewed via the TV link are moving vertically downward across the viewing screen. When this condition is achieved, the airplane is flying either directly up-wind or down-wind and $\theta = \psi$ is the direction of the wind relative to magnetic north.

While the aircraft is flying on this heading, the operator sends a radio command signal from the ground station which changes the conditions of the computer to those shown in Fig. 5. Here the servo feeding into the differential device 36 is de-energized so that the wind direction $\theta$ remains as one input to the differential. The aircraft is then turned across the wind at an arbitrary angle, whereupon it will drift and objects will then move across the TV viewing screen diagonally. The operator now sends radio command signals which operate a motor 40 which produces an output voltage $\rho$. This voltage is fed to a resolver 42 which produces two output voltages: $\rho \cos(\theta-\psi)$ and $\rho \sin(\theta-\psi)$. The cosine voltage is summed with the output voltage $V_{as}$ of an airspeed transducer 44 before it is applied to a resolver 46 connected mechanically to the camera platform, and the sine voltage is applied to an input circuit of the same resolver. The electrical output of the resolver is fed to a servo amplifier 48 which drives the TV camera 10 in azimuth. When the camera is aligned with the rector sum of the two quadrature component voltages the resolver output is nulled, and the camera has assumed the crab angle shown in Fig. 2. The operator then changes the magnitude and polarity of $\rho$ via the radio command link 50 until the TV camera has assumed the correct crab angle as indicated by objects showing no horizontal drift on the television viewing screen. When this condition has been achieved, the crab angle computer operating in the manner depicted by the block diagram of Fig. 5 will continuously compute and control the camera in azimuth to the proper crab angle corresponding to any aircraft heading.

A change in wind will result in drift becoming apparent on the TV viewing screen, whereupon the operator can re-establish his wind conditions in the same manner as described previously, even though the plane is outside his range of vision.

Figure 6:
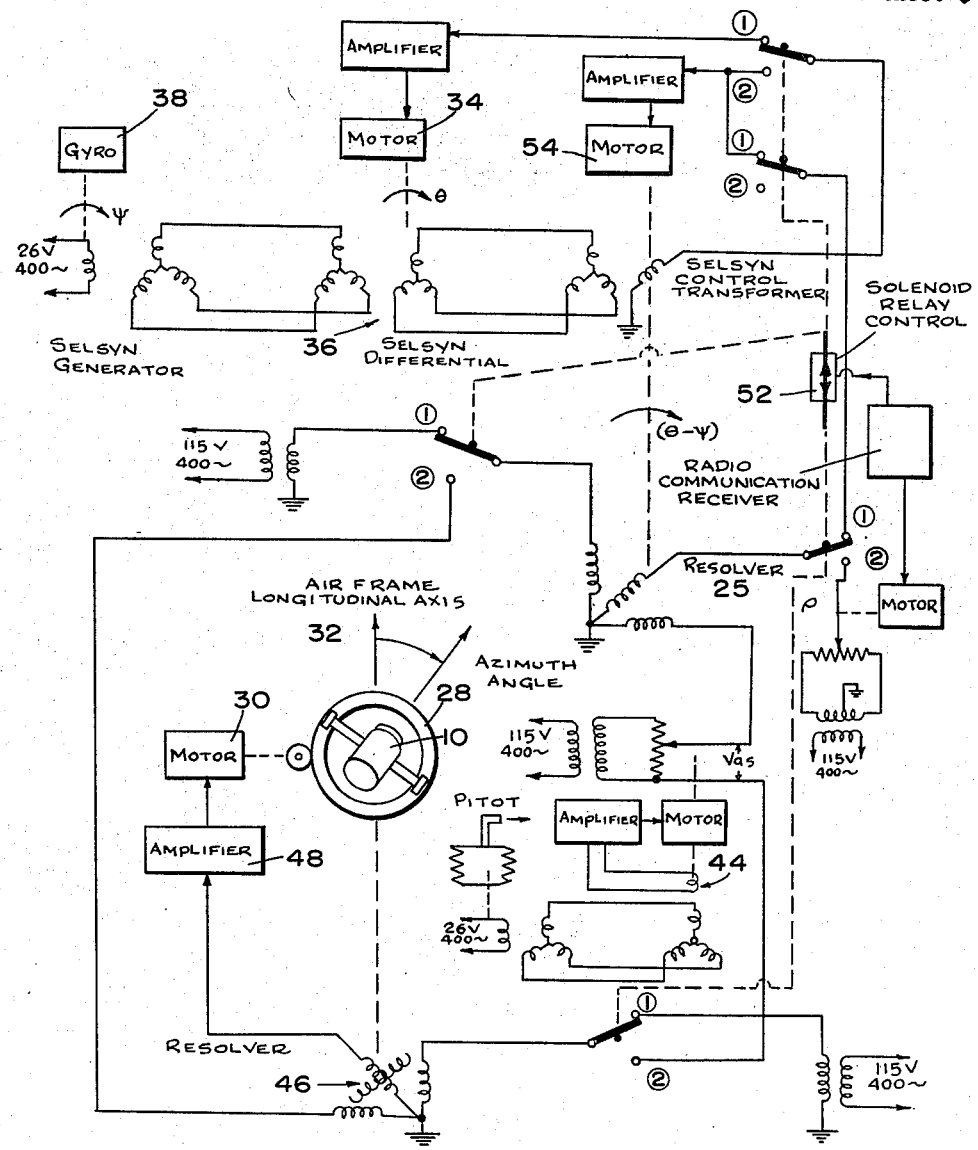
Fig. 6 is a schematic circuit diagram of an airborne computer system.

Fig. 6 shows a more detailed diagram, with schematic representation of one equipment configuration which will accomplish the angle summing and vector resolution. A radio command operated relay 52 changes the computer from the condition provided by its upper contacts to establish $\theta$ (position 1) to the condition provided by its lower contacts to establish $\rho$ and compute the crab angle (position 2).

With the upper contacts of the relay 52 closed, a motor 54 drives the resolver 42 to its zero degree position, the motor 34 causes $\theta$ to follow the heading angle $\psi$, and the motor 30 drives the camera angle to align with the longitudinal axis of the aircraft. When the lower contacts of the relay 52 are closed the motor 34 is de-energized and the output angle of the motor 54 will be $\theta-\psi$, the resolver 42 in energized by a voltage $\rho$, the output of the resolver 42 is applied to the resolver 46 after the cosine component is summed with a voltage $V_{as}$ proportional to airspeed, and the motor 30 causes the camera azimuth angle to change until it is aligned with the vector:

$$V_R = V_{as} + \rho \cos(\theta-\psi) + j\rho \sin(\theta-\psi)$$

The direction of this vector can be made to correspond with the ground track of the aircraft as determined via the TV link by varying the magnitude and polarity of the angle $\rho$ via the radio command link.

The elements and circuits which are conventional have been shown diagrammatically in the several figures and not been described in detail because their form and operation are well known in the art. Whereas a 115 volt, 400 cycle power supply has been indicated for the several circuits, any other suitable voltage and frequency could be employed.

While only one form of the system is shown and described, there are many modifications in form and arrangement of the parts of this system that may be made without departing from the spirit and scope of the present invention, as defined in the appended claims.

What is claimed is:

1. A crab angle computer for automatically maintaining the viewing angle of a camera in alignment with the ground track of an aircraft carrying said camera, comprising a camera mount rotatably supported in said aircraft for adjustment in the horizontal plane, an azimuth slewing motor and resolver for controlling said adjustment with respect to the longitudinal axis of said aircraft; a control circuit including means for delivering heading and wind direction input signals through a differential device, a second resolver for receiving said differential signal, a motor integrator controlled by signals which are functions of wind magnitude connected with said second resolver for delivering thereto a signal corresponding to the magnitude of the wind, an output terminal on said resolver for delivering a signal corresponding to the product of magnitude of the wind and the sine of the differential angle, a second output terminal for delivering a signal corresponding to the product of the magnitude of the wind and the cosine of the differential angle, an air speed transducer having an output in circuit with said second output terminal and applying thereto a signal corresponding to the air speed, said output terminals being connected to said azimuth motor resolver to move said camera mount so as to align its viewing angle with the ground track of the aircraft.

2. A crab angle computer and camera mount as defined in claim 1, and means for resetting the wind direction and magnitude input signals in accordance with the ambient wind condition for proper operation of the computer control under varying wind conditions.

3. A crab angle computer and camera mount as defined in claim 2, said means for resetting including radio command receiver means remotely controlled for operation from a distant station.

4. In a remotely controlled aircraft, a television camera mount rotatable in a horizontal plane for adjustment of a camera viewing angle, crab angle sensing means carried by said aircraft, and motor means responsive to said sensing means and having a driving connection with said mount continuously adjusting said viewing angle in alignment with the crab angle of the aircraft.

5. The combination defined in claim 4, said sensing means including a crab angle computer having an input circuit containing sensing means responsive to values of the wind and air speed vectors in the crab angle triangle, means for solving said triangle, and an output circuit energizing said motor means for controlling the angular adjustment of the viewing angle of said camera.

6. The combination defined in claim 5 including a remote television receiver having a viewing screen, radio command receiver means on said aircraft coupled with said motor means to align the viewing angle with the crab angle, and a remote operator for the receiver means.

7. The combination defined in claim 4, a horizontally stabilized platform for said camera mount, and a directional gyroscope on said platform for providing heading signals unaffected by flight maneuvers.

8. The combination defined in claim 7, said platform being universally mounted on a pair of gimbals, one on axial pivots and the other on transverse pivots, roll and pitch stabilizing motors and selsyns on said pivots respectively, adapted for connection to the roll and pitch axes of a vertical gyroscope.

References Cited in the file of this patent

UNITED STATES PATENTS

| 2,719,470 | Jensen | Oct. 4, 1955 |
| 2,798,116 | Wiens | July 2, 1957 |
| 2,814,199 | Waldorf | Nov. 26, 1957 |

FOREIGN PATENTS

| 599,889 | Great Britain | Mar. 23, 1948 |